(12) United States Patent
Zuckerman

(10) Patent No.: US 10,407,624 B2
(45) Date of Patent: Sep. 10, 2019

(54) METHODS TO DECONSTRUCT ASPHALTENE IN PETROLEUM PRODUCTS

(71) Applicant: Mathew M Zuckerman, Carbondale, CO (US)

(72) Inventor: Mathew M Zuckerman, Carbondale, CO (US)

(73) Assignee: DPD CHEMICAL, INC., Imperial, MO (US)

( * ) Notice: Subject to any disclaimer, the term of this patent is extended or adjusted under 35 U.S.C. 154(b) by 0 days.

(21) Appl. No.: 16/190,012

(22) Filed: Nov. 13, 2018

(65) Prior Publication Data

US 2019/0144760 A1 May 16, 2019

Related U.S. Application Data

(60) Provisional application No. 62/587,389, filed on Nov. 16, 2017.

(51) Int. Cl.
| | |
|---|---|
| *C09K 8/58* | (2006.01) |
| *C10G 21/00* | (2006.01) |
| *C10G 21/16* | (2006.01) |
| *E21B 43/16* | (2006.01) |
| *E21B 37/06* | (2006.01) |

(52) U.S. Cl.
CPC ........... *C10G 21/003* (2013.01); *C10G 21/16* (2013.01); *E21B 37/06* (2013.01); *E21B 43/16* (2013.01); *C10G 2300/1044* (2013.01)

(58) Field of Classification Search
CPC ........... C09K 8/58; C09K 8/584; C09K 8/588
See application file for complete search history.

(56) References Cited

U.S. PATENT DOCUMENTS

| | | | | |
|---|---|---|---|---|
| 2007/0042911 A1* | 2/2007 | Fletcher | ................. | C09K 8/588 507/203 |
| 2008/0149530 A1* | 6/2008 | Milligan | ................... | F17D 1/17 208/40 |

(Continued)

FOREIGN PATENT DOCUMENTS

CN 101445508 6/2009

OTHER PUBLICATIONS

Speight, J. "The Chemistry and Technology of Petroleum," CRC Press (1999).

(Continued)

*Primary Examiner* — Ellen M McAvoy

(57) ABSTRACT

A method of chemically changing extra-heavy/heavy crude oil into lighter crude oil and incrustation deposits in the down well casing's perforation using a chemical formulation under the following condition: 1) a working solution comprising heavy naphtha mixed with the chemical formulation is added to extra-heavy/heavy crude oil at ambient temperature by circulating through a centrifugal pump until the conversion of the heavy crude oil to lighter crude oil is complete and the crude oil is ready for transportation through pipeline or other means; or 2) thermal energy and equivalent to the normal pressure present, is artificially duplicated, at the down well location of perforations to contact the asphaltene incrustations with the formulation without dilution with naphtha or the energy imparted by a centrifugal pump.

26 Claims, 10 Drawing Sheets

Discovery of Light Crude Reserves

(56) References Cited

U.S. PATENT DOCUMENTS

| | | | |
|---|---|---|---|
| 2010/0056408 A1* | 3/2010 | Asomaning | C08L 61/14 508/460 |
| 2010/0064574 A1* | 3/2010 | de Almeida | C10L 1/026 44/351 |
| 2011/0092393 A1* | 4/2011 | Faust, Jr. | C09K 8/52 507/90 |
| 2013/0109598 A1* | 5/2013 | Nacson | C09K 8/588 507/218 |
| 2014/0008062 A1* | 1/2014 | Manrique | C09K 8/602 166/270.1 |
| 2015/0111799 A1* | 4/2015 | Miranda Olvera | C09K 8/584 508/283 |
| 2017/0198204 A1* | 7/2017 | Nguyen | C09K 8/588 |

OTHER PUBLICATIONS

BASF The Chemical Company, "Efka® FA 4601," 2012TDS0416, Nov. 2012, Ludwigshafen, Germany.
Yang Chen, et al "Novel chemical permeation enhancers for transdermal drug delivery," Asian Journal of Pharmaceutical Sciences, Jan. 2014, p. 51-64, vol. 9, Jilin, P.R. China.
Speight, J. "The Chemistry and Technology of Petroleum," pp. 1-22 and 70-75, CRC Press (1999).

* cited by examiner

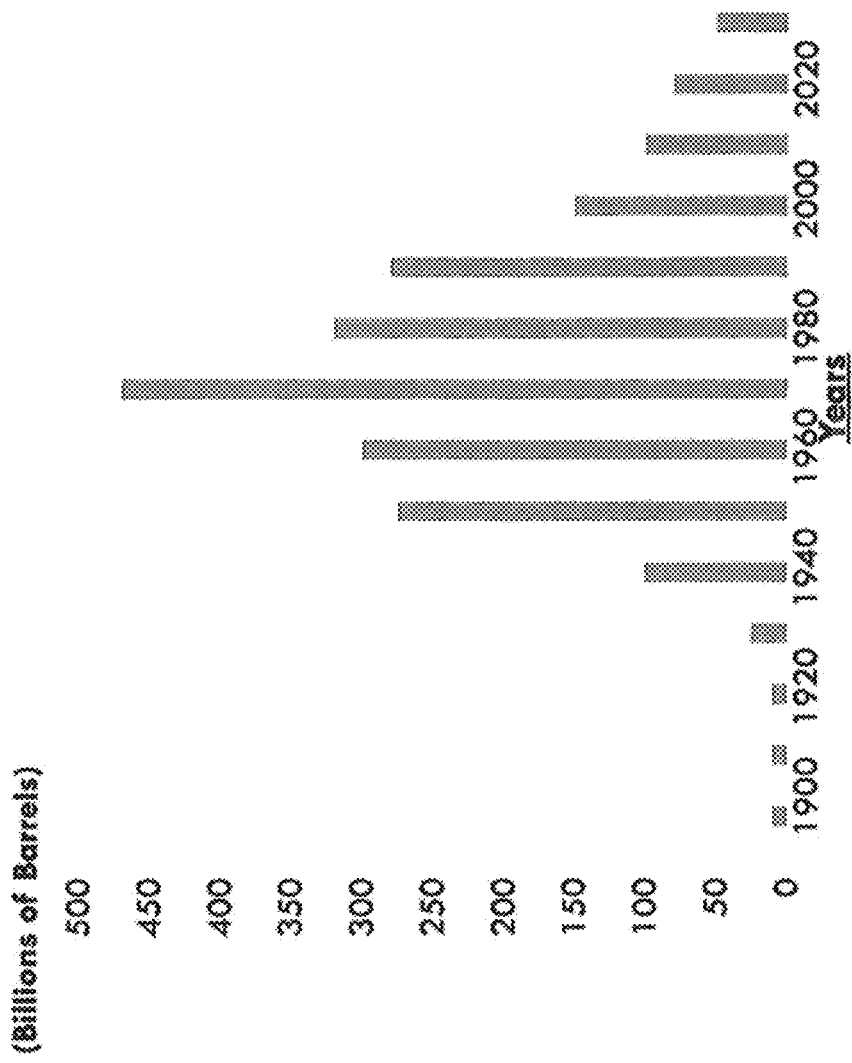

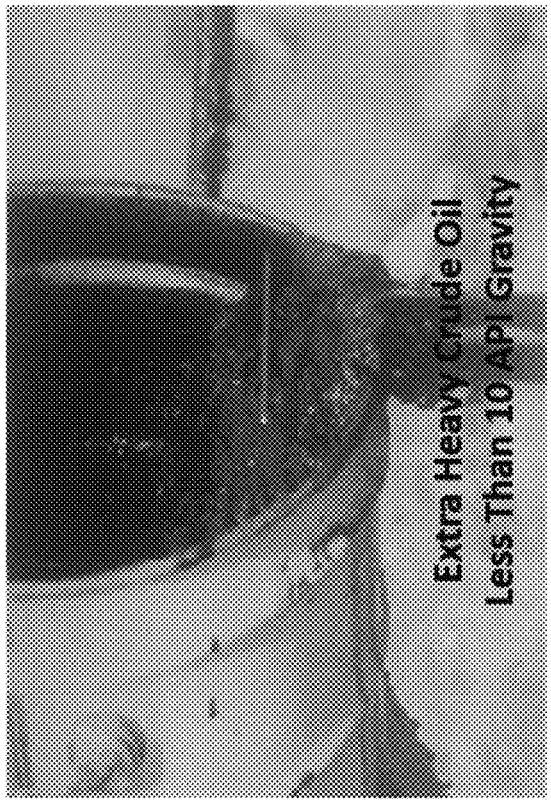

Extra Heavy Crude Oil Less Than 10 API Gravity

On this road of time, the light Aromatics and Saturate fraction, present in the bulk of the oil, are depleted by Condensing into Asphaltene and walled-off behind a Resin shell.

The formulation in the present invention is the unique chemical rejuvenator of Extra Heavy and Heavy Crude Oil, that takes less than a minute to reverse the millenniums of time over which Asphaltene content increased, to a younger Lighter Crude.

FIG. 2

Spot method for asphaltenic flocculation point determination, (A) Asphaltenes dispersed, (B) Asphaltenes beginning to flocculate and (C) Asphaltenes flocculated

Recirculation at Ambient Temperature
One (1) US gallon of Extra Heavy Crude
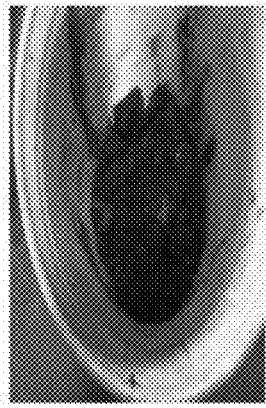
Add Super 2.6 fl. Oz. of Naphtha (2% of the Crude) & about ¼ Fl. Oz. (7.57 ml) of Formulation (1:500 Crude)
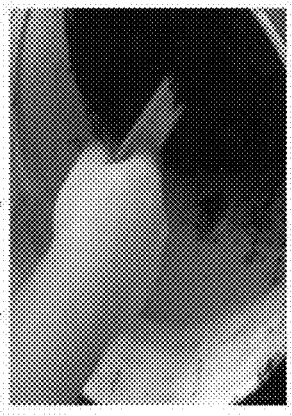
Viscosity is lowered, similar in viscosity to heavy motor oil to allowing movement by a centrifugal pump
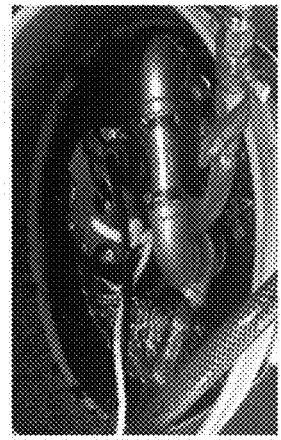
FIG. 6

Direct Injection at Elevated Temperature

Heavy Crude Yield Comparison by Dilution with Intermediate Crude and Naphtha vs. Formulation 200,000 BPD Exported Crude Oil

| 1) Production | | API 8 Crude | Naphtha | API 24 Crude | Formulation | Merey 16 |
|---|---|---|---|---|---|---|
| Practice One, BPD | | 100,000 | 0 | 100,000 | 0 | 200,000 |
| | US Dollars | $3,000,000 | 0 | $5,000,000 | 0 | $8,000,000 |
| | | Cost is $5.0 million to upgrade $3.0 million of API 8 to sell for $8.0 million | | | | |
| Practice Two, BPD | | 160,000 | 40,000 | 0 | 0 | 200,000 |
| | US Dollars | $4,800,000 | $2,400,000 | 0 | 0 | $8,000,000 |
| | | Cost is $2.4 million to upgrade $4.8 million of API 8 to sell for $8.0 million | | | | Net = $0,800,000 |
| Formulation | | 199,600 | 0 | 0 | 400 | 200,000 |
| | US Dollars | $7,984,000 | 0 | 0 | $1,996,000 | $8,000,000 |
| | | Cost is $2.0 million to upgrade $8.0 million of API 8 to sell for $8.0 million | | | | Net = $6,004,000 |
| 2) Assumptions | US Dollars / BBL | API 8 | 30 | Formulation | 10 | Merey 16 40 |
| | | API 24 | 50 | | | Naphtha 60 |

The blending of the Formulation allow the utilization of 199,600 bbl. of API 8 Crude with the purchase of only 400 bbl. of formulation and frees up 100,000 bbl. of API 24 Crude for sale or eliminates the need to import 40,000 bbl. of Naphtha.

METHODS TO DECONSTRUCT ASPHALTENE IN PETROLEUM PRODUCTS

The current application claims a priority to a U.S. provisional application Ser. No. 62/587,389 filed on Nov. 16, 2017.

FIELD OF THE INVENTION

The present invention relates generally to a method of increasing the American Petroleum Institute (API) gravity and decreasing the viscosity of crude oil and crude oil like petroleum products by adding a chemical formulation to the crude oil. The present invention relates specifically to chemical formulations that increase API gravity of extra heavy crudes and heavy crudes either by adding super naphtha comprising heavy naphtha and the chemical formulation or by directly adding undiluted chemical formulations at the well head, to levels that allow certification of the crude as heavy or intermediate crude and provide sufficient mobility of the crude by reducing its viscosity, so that the crude can be transported by pipeline or other means.

The present invention also specifically relates to deconstruction of annulus, formed in the well casing's perforations, by the chemical formulation, acting in concert with the solvents and aromatic components in the reservoir of crude, to reduce the diameter of the deposited materials to increase the flow of oil into casing resulting in an increase in crude oil production.

BACKGROUND OF THE INVENTION

It might be surprising to learn that, as shown in FIG. 1, new discoveries of light crude peaked in the 1970 and have continued a downward yearly trend so that the future availability of light crude in sufficient quantities is uncertain. The massive oil reserve discoveries that are reported almost monthly are mainly heavy and extra heavy crudes with API gravity of less than 10 degrees (Speight, 1999). The demand for light crude as a diluent for heavier crudes combined with the decrease in discoveries of light crude oil create the dawning of a supply crisis that requires the invention of an alternative solution to make heavy crudes and extra heavy crudes into the lighter crudes.

The heavy crudes that include Mexico's Maya, Venezuela's Merey and Canada's Western Canadian Select (WSC) are all nominally API 16 degrees. The countries with the world's largest crude oil reserves are Venezuela and Saudi Arabia with each boasting 300 billion barrels. However, half of the reserves of Venezuela are extra heavy crude oil and only ten percent (10%) of the reserves of Saudi Arabia are extra heavy crude oil. It is generally accepted that extra heavy oil is uneconomical to produce using present technology when the market for crude oil is below sixty dollars ($60) a barrel. This fact sets a foundation for the urgency of making extra heavy crude oil available to fill the demand for petroleum products. The present invention offers a superior cost effect alternative to present technology to aid the industry in the production of extra heavy crude oil.

In the present invention, the preferred embodiment of the Primary Component is the chemical isosorbide dimethyl ether. This chemical can be synthesized, in the presence of a phase transfer catalyst, from isosorbide, alkali and chloromethane (Zhao et al, (2011)).

OBJECTIVES OF THE INVENTION

It is a principal object of the present invention is to chemically change extra heavy and heavy crudes into lighter crudes by adding chemical formulations that require only as little as a ten and three quarters (10.75) fluid ounces per barrel of crude and avoid the necessity of blending with up to 50% light or intermediate crudes or up to twenty percent (20%) of the dilatants such as naphtha in crude volume to produces the same result.

It is an object of the present invention to provide chemical formulations to be attracted to the resin present in crude oil, acting alone or in concert with other chemicals, that allow the aromatic and saturate components present in the bulk of the crude to migrate across the resin to deconstruct the asphaltene present in the crude oil.

It is another object of the present invention is to repurpose the crude's own aromatics and saturates, present in the bulk of the crude, to deconstruct the asphaltene and return the saturates and aromatics to the bulk of the crude oil, which results in an increase in the API gravity of the crude oil.

It is a further object of the present invention is to select the primary chemical in the formulation from a group of transdermal chemicals used as a carrier to deliver vitamins or other materials across human skin to the collagen (Chen et al., 2014), where the primary chemical is used in concert with other chemicals (i.e., secondary, tertiary and quintenary chemicals) that are generally regarded as safe (GRAS), with flash points above 200 degrees F. and have limited or no odor.

It is still further object of the present invention to add the chemical formulation by one tenth of the previous used amount of naphtha to produce super naphtha for blending at ambient temperature or by directly adding undiluted formulations at the well head, to lower the API gravity of extra heavy or heavy crudes to levels that allow certification of the crude as heavy or intermediate crude and provide sufficient mobility of the crude by reducing its viscosity, so that the crude can be transported by pipeline or other means.

It is another and further object of the present invention to tailor the chemical formulation based on the dipole moment of the resin to asphaltene ratio in the crude for increasing its API gravity.

It is a still further object of the present invention to deconstruct the annulus, formed in the well casing's perforations, by the formulation, acting in concert with the solvents and aromatic components in the reservoir of crude, to reduce the diameter of the deposited materials and increase the flow of oil into casing resulting in an increase in crude oil production.

SUMMARY OF THE INVENTION

The present invention employs a novel and non-obvious combination of the following elements to manufacture a chemical formulation, that only requires a small amount to chemically change extra heavy and heavy crude into lighter crudes using a primary chemical that is attracted to the resin present in crude oil, acting alone or in concert with other chemicals, allowing the aromatic and saturate components present in the bulk of the crude to migrate across the resin that encapsulates the asphaltene present in the crude oil, and to react with the asphaltene so as to deconstruct the asphaltene into the aromatic and saturate building block materials that previously had been condensed to asphaltene, over millenniums of time, and are now returned to the bulk of the crude oil to result in an increase in the API gravity of the crude oil.

The present invention relates to a method of chemically changing extra heavy and heavy crude into lighter crude, wherein in one preferred embodiment, a super solvent naphtha and formulation comprises chemicals, in volume percent of: 0.84 gallons (107.5 fluid ounces) of heavy naphtha, 2% of the volume of the crude, and 10.75 fluid ounces of the chemical formulation per barrel of crude oil, 1 part of formulation per 500 parts of crude, that has been shown to reduce the API of a Canadian heavy crude from 12 API gravity with estimated 11% asphaltene content by weight to medium crude with 26 API gravity with an estimated 4% asphaltene content by weight.

The present invention relates to a method of chemically changing extra heavy and heavy crude into lighter crude wherein, in another preferred embodiment, the method utilizes the thermal energy present at the well head of heavy or extra heavy crude oil, where 10.75 fluid ounces of the chemical formulation, added to one barrel of crude oil, has been shown to reduce the API of a Venezuelan extra heavy crude from 8 API gravity with estimated 16% asphaltene content by weight to medium crude with 16 API gravity with an estimated 8% asphaltene content by weight.

A further method according to the present invention wherein the relative quantities of Primary to Secondary Component in the formulation is tailored to produce multiple formulations that are prepared to be proportional to the dipole moment characteristic of the resin and asphaltene components in the crude.

Still another further method according to the present invention is deconstruction of annulus, formed in the well casing's perforations, by the formulation, acting in concert with the solvents and aromatic components in the reservoir of crude, to reduce the diameter of the deposited materials and increase the flow of oil into casing resulting in an increase in crude oil production.

BRIEF DESCRIPTION OF THE DRAWINGS

The patent or application file contains at least one drawing executed in black and white. Copies of this patent or patent application publication with black and white drawing(s) will be provided by the office upon request and payment of the necessary fee.

To further clarify the above and other advantages and features of the present invention, a more particular description of the invention will be rendered by references to specific embodiments thereof, which are illustrated in the appended drawings. It is appreciated that these drawings depict only typical embodiments of the invention and are therefore not to be limiting of its scope.

Figure 3:
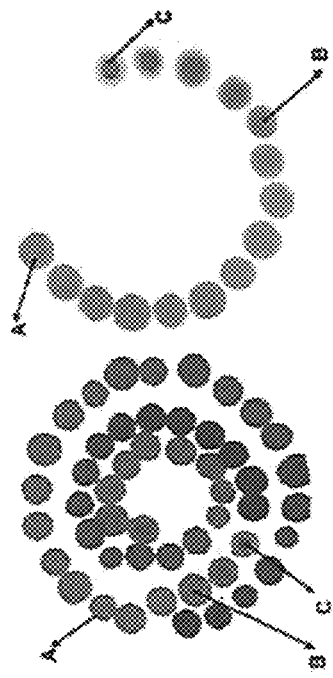
Figure 4:
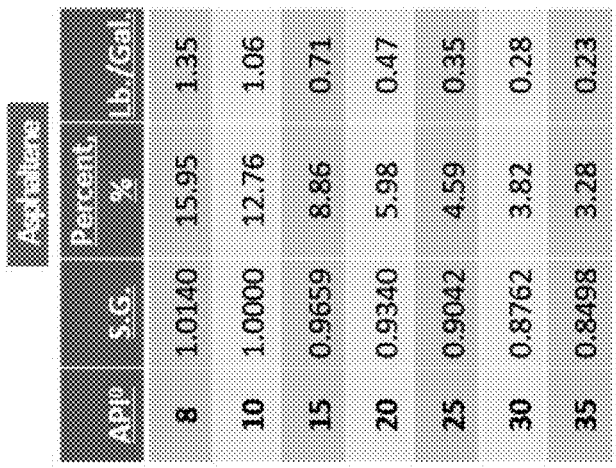
Figure 5:
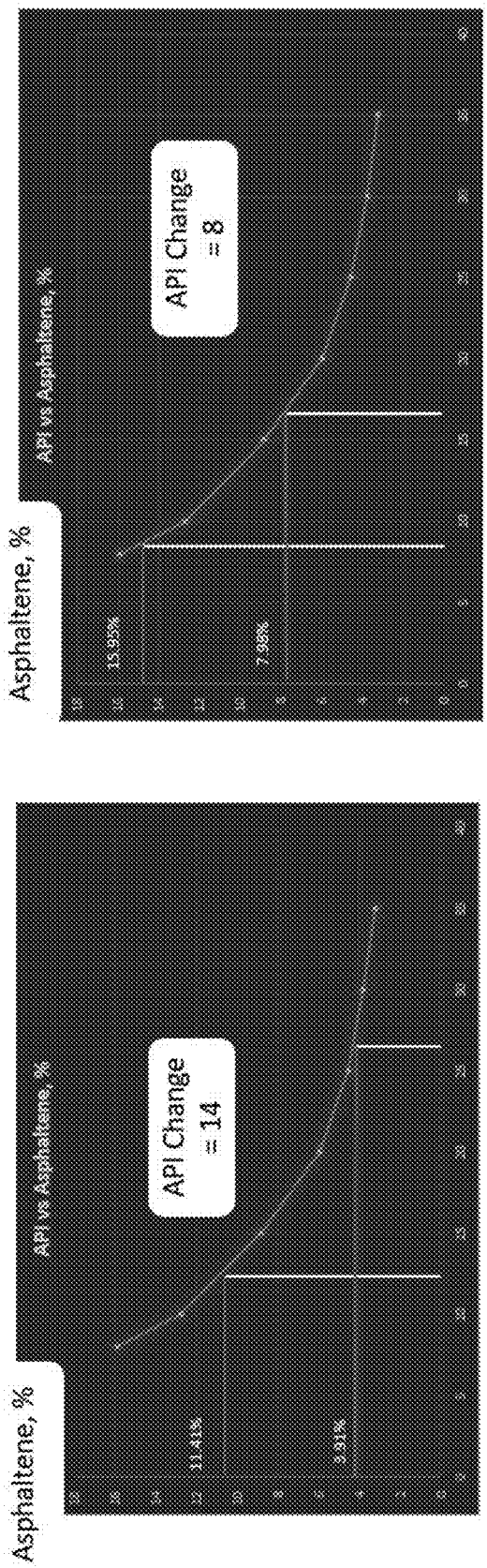
Figure 7:
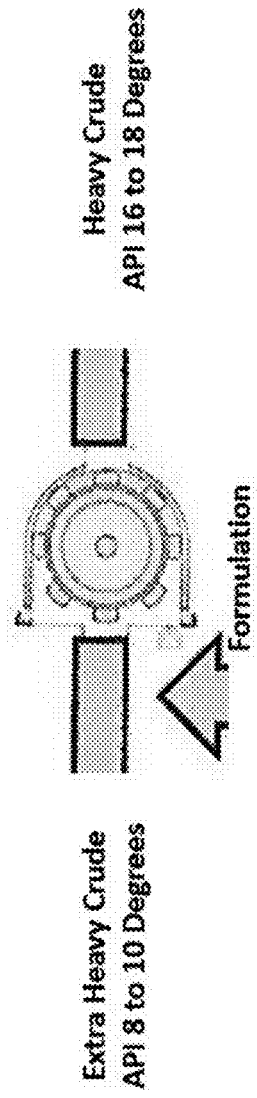
Figure 9:
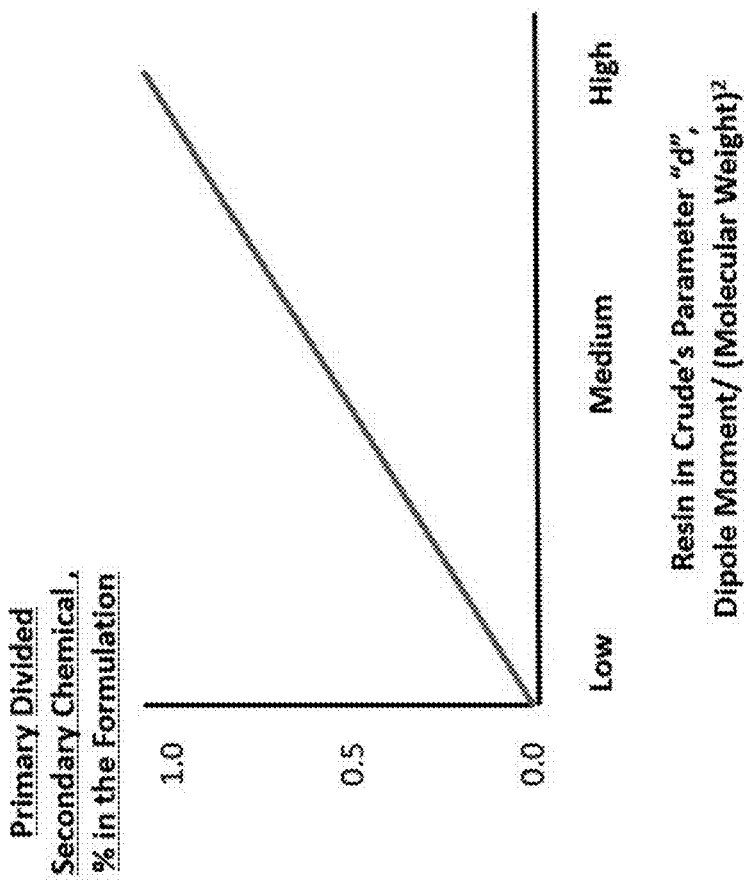
Figure 10:
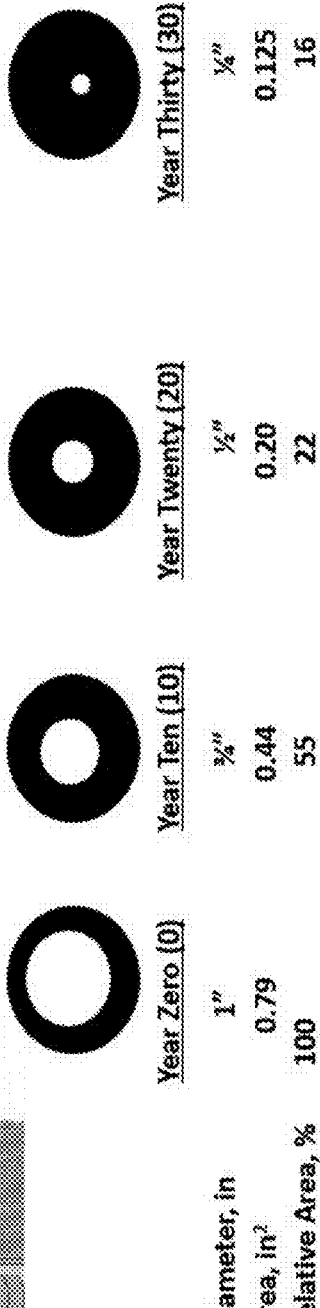

The invention will be described and explained with additional specificity and detail through the use of the accompanying drawings in which:

FIG. 1 shows the history of discovery of light crude;

FIG. 2 shows what extra heavy crude oil looks like and states that the blending of crude oils with a chemical formulation is like reversing the time that changed heavy crude oil into lighter crude oil;

FIG. 3 illustrates when the correct environment is created for crude oil, the asphaltene contained in the crude will be deconstructed in a similar way to the deconstruction under laboratory test for the presence of asphaltene;

FIG. 4 shows the API as a function of the asphaltene content based on heavy and intermediate crude oil from the Puerto La Cruz oil field in Anzo Tegui State, Venezuela;

FIG. 5 shows the API increase results of treatment of Canadian heavy crude and Venezuelan extra heavy crude with the chemical formulation at a dosage of one (1) part to five hundred (500) parts of crude Oil;

FIG. 6 shows the decrease in viscosity of extra heavy crude when treated with super naphtha (heavy naphtha+chemical formulation), and adding mixing energy by a centrifugal pump to contact the formulation with the crude to produce a crude suitable for transportation;

FIG. 7 shows the system utilizes the thermal energy present at the well head of extra heavy crude oil to contact the formulation with the crude oil through a centrifugal pump without prior dilution of the formulation with lighter crude oil or diluent such as naphtha;

FIG. 8 shows the increase in production of extra heavy crude and the greater economic benefit that results from use of the formulation to convert API 8 crude to crude that is certifiable at API 16 Merey Crude oil;

FIG. 9 is a method of tailoring the relative quantities of Primary to Secondary Component to produce multiple formulations that are prepared to be proportional to the dipole moment characteristic of the resin and asphaltene components in the crude; and FIG. 10 depicts the reduction in crude produced from a vertical well as the asphaltene, present in the crude deposits as an annulus in the casing's perforation that reduces production as the well ages.

DETAILED DESCRIPTION OF THE INVENTION

All illustrations of the drawings are for the purpose of describing selected versions of the present invention and are not intended to limit the scope of the present invention.

The invention will be described and explained with additional specificity and detail through the descriptions of FIG. 2 to FIG. 10 that follow.

FIG. 2 shows what extra heavy crude oil looks like and states that the blending of crude oils with the chemical formulation is like reversing the time that changed the heavy crude oil into lighter crude oil. The present invention teaches a method of chemically changing extra heavy and heavy crude into lighter crudes using a primary chemical that is attracted to the resin present in crude oil, acting alone or in concert with other chemicals, that allows the aromatic and saturate components present in the bulk of the crude to migrate across the resin that encapsulates the asphaltene present in the crude oil, and to react with the asphaltene so as to deconstruct the asphaltene into the aromatic and saturate building block materials that previously had been condensed to form asphaltene, over millenniums of time, and are now are returned to the bulk of the crude oil to result in an increase in the API gravity of the crude oil.

FIG. 3 illustrates that when the correct environment is created for crude oil, the asphaltene contained in the crude will be deconstructed in a similar way to the deconstruction under laboratory test for the presence of asphaltene. The process of increasing the API of crudes is based on the ability of the primary chemical, supported by additional components, to reach the resin that encapsulates asphaltene, like an egg shell, to deliver the secondary and tertiary chemicals that release the fractal building block components, n-heptane, a saturate component, and toluene, an aromatic component. This process is called "Chemical Cracking". The process of treatment mimics the process of analysis for the quantity of asphaltene. The decomposition components in the laboratory analysis that migrate from the asphaltene are n-heptane, a saturate component, and toluene, an aromatic component. The present invention is parallel to the release of the same class of saturate and aromatic components from the asphaltene by the chemical formulation.

FIG. 4 shows the API as a function of the asphaltene content based on heavy and intermediate crude oil from the Puerto La Cruz oil field in Anzo Tegui State, Venezuela. Current practice is the blending of Venezuelan extra heavy Merey API 8 crude oil with 50% intermediate crude with API 24 gravity or 20% naphtha to produce Merey 16. This process of blending, is a mathematic certainty, produces the requisite API by the dilution. In the present invention, a formulation is contacted with the extra heavy crude at a dosage of as little as one (1) part to five (500) hundred parts of crude to produce the same result. One preferred embodiment of the formulation to deconstruct extra heavy crude with API 8 degrees into heavy crude consists of primary chemical: isosorbide dimethyl ether, CAS #5306-85-4; secondary chemical in volume percent: 57.1% polysorbate 80 (polyoxyethylene (20) sorbitan monooleate), CAS #9005-65-6; 28.6% sorbitan monooleate, CAS #1 338-43-8; 2.9% tween 85 (polyoxyethylene sorbitan trioleate), CAS 9005-70-3; and 11.4% tween-20 (polyoxyethylene (20) sorbitan monolaurate), CAS #9005-64-5; tertiary chemical that comprises the following chemicals: alkyl alcohol ethoxylates with carbon chain length of 9 to 11, CAS #68439-46-3, and methyl soyate, CAS #67784-80-9; and quaternary chemical Efka FA 4601 (blend of selected fatty alcohol sulfates) manufactured by BASF (See technical information by BASF (2012)) and butylated hydroxytoluene (BHT), CAS #128-37-0. In this preferred embodiment of the primary, secondary, tertiary and quintenary chemical comprise the following chemicals in volume percent: 14% of the primary chemical, isosorbide dimethyl ether, CAS #5306-85-4; 28% of the secondary chemical blend; 57% of the tertiary chemical consisting of 29% alkyl alcohol ethoxylates, with carbon chain length of 9 to 11, CAS #68439-46-3 and 28% methyl soyate, CAS #67784-80-9; and 1.25% of the quintenary chemical consisting of 1% Efka FA 4601 manufactured by BASF and 0.25% of butylated hydroxytoluene, CAS #128-37-0.

FIG. 5 shows the API increase results of treatment of Canadian heavy crude and Venezuelan extra heavy crude with the chemical formulation at a dosage of one (1) part to five hundred (500) parts of crude oil. This same dosage of the chemical formulation reduces the asphaltene content by approximately eight percent (8%) in both Canadian heavy crude oil and Venezuelan extra heavy crude oil. The API gravity of the product after treatment is a function of the starting point API gravity of the crude so the destruction of the same quantity of asphaltene results in the Canadian heavy crude change in API gravity from 12 degrees to 26 degrees and the Venezuelan extra heavy crude from 8 degrees to 16 degrees.

FIG. 6 shows the decrease in viscosity of extra heavy crude when treated with super Naphtha comprising heavy naphtha and a chemical formulation, and adding mixing energy by a centrifugal pump to contact the formulation with the crude to produce a crude suitable for transportation. The first method of applying the present invention occurs at ambient temperature, where in order to obtain proper contact between the very viscous extra heavy crude and a small quantity of formulation, it is necessary to produce a working solution with naphtha. This working solution differs from the common practice of using naphtha to dilute the crude at a commonly used concentration of twenty percent (20%) in a blend with eighty percent (80%) crude oil. Here the target for dilution is the formulation and not the crude oil and only one tenth the quantity of naphtha is used: two percent (2%) in a blend with ninety eight percent (98%) crude oil. In one preferred embodiment of the present invention, a Super Solvent Naphtha (SSN) was prepared from 0.84 gallons (107.5 fluid ounces) of heavy naphtha and 10.75 fluid ounces of the chemical formulation per barrel of crude oil. Contacting this working solution in at a dosage of two percent (2%) to ninety-eight (98%) crude has been shown to reduce the API of a Canadian heavy crude from 12 API gravity with estimated 11% asphaltene content by weight to medium crude with 26 API gravity with an estimated 4% asphaltene content by weight.

Shown in FIG. 7 is the system that utilizes the thermal energy present at the well head of extra heavy crude oil, to contact the formulation with the crude oil through a centrifugal pump without prior dilution of the formulation with lighter crude oil or diluents such as naphtha. The second method of applying the present invention occurs at the elevated temperature of the well head where the viscosity of the extra heavy crude oil is sufficiently low that the formulation can come in contact with the crude without the need to be diluted prior to contact. The thermal energy present at the well head of the crude oil is decreased as the temperature decreased during pretreatment to remove sand and water from the crude prior to contact with the formulation through a centrifugal pump from approximately the well head temperature of 85° C. (185° F.) to 74° C. (165° F.) at the discharge from the pretreatment. Utilizing the thermal energy present in the crude oil at the well head, 10.75 fluid ounces of the chemical formulation per barrel of crude oil, 1 part of formulation per 500 parts of crude, has been shown to reduce the API of a Venezuelan extra heavy crude from 8 API gravity with estimated 16% asphaltene content by weight to medium crude with 16 API gravity with an estimated 8% asphaltene content by weight.

Shown in FIG. 8 is the doubling the production of extra heavy API 8 Crude that results from blending with the formulation at a dose of one part to 500 parts of this crude to produce 200,000 barrels per day (bpd) of Merey 16 for export from Chevron's Venezuela facility. The blending of the formulation allows the export of nominally 200,000 bpd of upgraded API 8 crude to Merey 16: requires only 400 bpd of the formulation; eliminates the cost of import 40,000 bpd of Naphtha; and frees up 100,000 bpd of API 24 crude instead of debasing its value when blended with 100,000 bpd of API 8. FIG. 8 also shows that the formulation at a cost of $10 a barrel of crude, formulation, treated produces estimated revenue after cost of chemicals, on the sale of 200,000 bpd, of $6 million versus only $3 million and $5.6 million for Practice One, blending with API 24, and Practice Two, blending with naphtha, respectively.

In this age of the internet we are getting use to customization and the "One Size Cannot Fit All" of the past or "one formula treats all crudes or crude deposits" no longer works. This customization is performed by: separating a crude into its resin and asphaltene components; measuring the dipole moment for each of these components; estimating an average molecular weight; and calculating the parameter (d) with the molecular weight as the numerator and the dipole moment squared in the denominator. For example, water, the universal solvent, has a value of 5.23 $(18/(1.8546)^2)$.

Model Numbers (MN) for invention's chemical family of products based on dipole moment pairs of (resin, asphaltene), d's, are assigned one of nine (9) MN for Viscosity Improvers (VIs) as shown in the following table.

|                              | Resin, MW/d² |         |          |
|                              |     Low      | Medium  |   High   |
| Asphaltene, MW/d²            |  2.4-2.67    |2.67-2.93| 2.93-3.2 |
|---|---|---|---|
| 3.3-4.5  Low    | VI-1000 | VI-1100 | VI-1200 |
| 4.5-6.9  Medium | VI-1010 | VI-1110 | VI-1210 |
| 6.9-8.1  High   | VI-1020 | VI-1120 | VI-1220 |

Shown in FIG. 9 is a method of tailoring the relative quantities of Primary to Secondary Component to produce multiple formulations that are prepared to be proportional to the dipole moment characteristic of the resin and asphaltene components in the crude. The dipole moment parameter, "d", can be low, medium or high charged. The measurement of the charge is the dipole moment that is first squared and incorporate the molecular weight into a parameter, as the denominator, to take molecular size into consideration. A very larger molecule with a small charge difference between its ends shows a large dipole moment. But it does not have a very large charge density. Its high dipole moment stems from the fact that the + and − charges are far apart. What is needed in the practice of the present invention is the ability of the Primary Component to latch onto the polar end of the resin and allow the transport of chemicals across the Resin. The non-polar end is positioned to face the opposite side of the resin where the Asphaltene lies. Once the resin forms a chemical bridge, the formulations' chemicals can now work in concert with the aromatics and saturates contained in the crude and these chemicals are now available to attack the asphaltene. The deconstruction of the asphaltene results in the availability of the fractional components, represented by n-heptane and toluene, to be returned to the bulk of the crude to increase its API. Another use of the present invention, wherein the same asphaltene component of crudes as reported in FIG. 2, that are present in all crudes located below grade, are deposited in the well casing's perforations, forming an anulus that reduces production, is deconstructed by the formulations, acting in concert with solvents and aromatic components in the reservoir of crude, to reduce the diameter of the deposited materials in the well casing's perforations, to increase the flow of oil into casing resulting in an increase in crude oil production.

Depicted in FIG. 10 is the reduction in crude produced from a vertical well as the asphaltene, present in the crude deposits as an annulus in the casing's perforation that reduces production as the well ages. Just as asphaltene content is increase with the age of the crude, as reported in FIG. 2, so does asphaltene build-up in the down well casing perforations. This build-up introduces a head loss, that increases over time, that results in a decrease in the rate of flow of crude into the casing that results in a decrease in production. FIG. 3 shows that after the first three decades of first Primary Treatment and then Secondary Treatment the original one-inch diameter perforation now is ¼" diameter with the associate area for flow being attenuated from 100% to 16% that is an 84% reduction in area available for flow of the crude.

The restoration of a well by Enhanced Recovery, with the formulation, to deconstruction the Asphaltene by repurposing the Aromatics and Saturates in the crude oil present in the oil-bearing stratum applies to 4" Stripper and high production wells of larger diameter of vertical and horizontal type. The following embodiment is for a Stripper well. The Typical Well Characteristics are: API Gravity of 30°; Casing OD of 4"; depth of 2,000 feet of gun perforations with an average diameter on one (1) inch; initial production of 18 bpd; age of well at time of starting Enhanced Recovery is 18 years; a Primary Recovery period was years 1 to 10 with a total of 43,800 bbl produced that contained 215 tons of asphaltene; and a Secondary Recovery period was years 11 to 30 with a total of 12,000 bbl produced that contained 237 tons of asphaltene.

The Flow Rate (Q) BBL/Day is a linear function of the difference in pressure, psi, across the perforations and the area, in² available for the flow of crude through the perforations. The down well static pressure at the average depth of the perforations under 2,000 feet of API 30° crude is 780 psi (60 atmospheres). In initial production the oil reservoir itself provides a pressure greater than the down well static pressure. This positive pressure difference is maintained by pumping the oil from the casing that produces the oil flows. Over time the pressure decreases, and water flooding, Secondary Recovery, is employed to augment the pressure in the oil reservoir to maintain the crude's production rate in barrels per day (bpd). Before the present invention, Perforation area decrease has ineffectively been addressed by shuttering the well and use of chemicals such as Diesel or Xylene. It was taken as a certainty that production yield of the well had to decrease over time. The characteristics of the Perforations are: 0.23 to 0.72 inches in diameter; 4-12 shoots per foot; and a vertical length of 6" to 48". Crude with API Gravity of 30° has a specific gravity of 0.8762 and an asphaltene content of nominally 3.82% by weight (about 12 pounds per barrel). Over time there is a decrease in the area in the perforations available to create a channel between the oil-bearing stratum, the pay zone, and the well bore.

Enhanced Recovery is the method of applying the formulation to remove the asphaltene from the perforation by a combination of periodically applying the formulation in a Blast Treatment followed by a series of Maintenance Treatments. The Blast Treatment Sequence as applied to the a Stripper well with the above defined characteristics comprises: 1) vacuum Truck extract 32 BBL (1,350 gallon) crude to empty well and expose perforations; 2) place one (1) bbl of chemical down well to fill to 62.5 feet; 3) fill with water to achieve 900 psi (60 atmospheres) or pressurize to 900 psi with air; 4) allow soak time of one hour; 5) vacuum Truck extracts water or release air pressure; and 6) allow casing to fill with crude at an estimated rate of 10 bbls per day. The Maintenance Treatment consists of adding one (1) barrel of formulation to 500 bbls of water that is injected into the oil reservoir as an addition to the Secondary Recovery process.

Primary Recovery only produces about 10% of the reserves and Secondary Recovery only an additional 20% of the reserves. The recovery forecast is based on: one decade of Primary Recovery; two decades of Secondary Recovery; and starting Enhanced Recovery, with the formulation, at the start of the third decade and continuing thereafter to the end of decade fifth. The total oil reservoir is estimated to contain 275,000 bbl. Primary and Secondary Recovery together produce 82,500 BBL (30% of the oil reserves). Enhanced Recovery contributes a total of 70,110 bbl over the third. Fourth and fifth decades with 36,135 bbl (13% of the oil reserve) in the third decade and a total of 33,975 bbl (25% of the oil reserve) in the fourth and fifth decade.

As used herein, "a" or "an" means one or more (or at least one).

Although the invention has been explained in relation to its preferred embodiment, it is to be understood that many other possible modifications and variations can be made without departing from the spirit and scope of the invention as hereinafter claimed.

REFERENCES

Chen Y., Quan P., Liu X., Wang M., and Fang L. Novel Chemical Permeation Enhancers for Transdermal Drug Delivery. Asian Journal of Pharmaceutical Sciences 9, 51-64 (2014).

BASF: Technical Information for Efka FA 4601, November 2012.

Speight, J. The Chemistry and Technology of Petroleum. CRC Press (1999).

Zhao, L. et. al., CN 101,445,508 A, "Method for Synthesizing Isosorbide Dimethyl Ether" (2011).

What is claimed is:

1. A method of reducing a composite specific gravity of a bitumen, an API Gravity in a range of 5 to 10 degrees, or a heavy crude, an API Gravity in a range of 10 to 20 degrees, to produce a crude oil with a lower composite specific gravity, the method comprising steps of:
introducing a chemical into a bitumen or a heavy crude; and
mixing the chemical and the bitumen or the heavy crude, wherein the chemical first attaches to a surface of a resin component, present in a crude oil, that encapsulates an asphaltene, present in the crude oil, that walls off an asphaltene component from the crude oil, specific gravity in a range of 1.05 (API Gravity of 3.2°) to 1.10 (−2.9° API Gravity), the chemical forms a bridge that allows saturates, present in the crude oil, represented by a chemical n-Heptane, specific gravity of 0.7276 (63° API Gravity) and aromatics, present in the crude oil, represented by a chemical toluene, specific gravity of 0.86690 (31.7° API Gravity) to come in contact the asphaltene and subsequently deconstruct the asphaltene into building block chemicals of saturates and aromatics that were part of a formation of the asphaltene component and now after deconstruction can travel in a reverse direction across the bridge formed by the chemical contributing to a lower composite specific gravity for the crude oil of less than 0.9659 (15° API Gravity), the chemical is a member of a subset of a population of chemicals used for transdermal transfer of vitamins or other chemicals across a stratum corneum of a human skin to a collagen that lies beneath the human skin that are in addition generally regarded as safe (GRAS) by the US Food and Drug Administration so that the population of chemicals qualifies as exempt from the Federal Food and Cosmetic Act's food and tolerance requirements of the US Federal Food and Cosmetic Act, limited or no odor and have a flash point greater than 93° C./200° F., a dose of the chemical is at a maximum volumetric per ratio to the bitumen or the heavy crude of 1 part to 100 parts of the bitumen or the heavy crude.

2. The method according to claim 1, the population of chemicals used for transdermal transfer across the stratum corneum comprises fatty acids, terpenes, sulphoxides, laurocapram, pyrrolidones, fatty alcohols, alcohols, glycols, surfactants and urea.

3. The method according to claim 1, wherein the chemical that is part of the population of chemicals used for transdermal transfer is isosorbide dimethyl ether CAS # 5306-85-4.

4. The method according to claim 1, wherein the chemical is isosorbide dimethyl ether in a composition that includes one or more of the other members of the population of chemicals used for transdermal transfer that in combination with the chemical are present at a maximum volumetric per ratio to the bitumen or the heavy crude of 1 part to 100 parts of the bitumen or the heavy crude.

5. The method according to claim 4, wherein the other member of the population of chemicals used for transdermal transfer that is combined with the chemical are a blend of the following in a volume percent: surfactants, 28.67%; alcohol, 28.67%; fatty alcohol, 28.67%; and isosorbide dimethyl ether, 14%.

6. The method according to claim 5, wherein a volumetric percentage of a component changes in proportion to a percent by a weight ratio of the asphaltene component to the resin component and magnetic properties of the asphaltene component and the resin component contained in the bitumen or the heavy crude, the weight ratio is multiplied by the magnetic properties defined as a dipole moment per mole of each component where, a numerator is the dipole moment squared and a denominator is a molecule weight, the volume percent of isosorbide dimethyl ether, the chemical, to the other chemicals used for transdermal transfer is increased in proportion to an increase in the weight ratio of the asphaltene component to the resin component adjusted for the magnetic properties of the asphaltene component and the resin component.

7. The method according to claim 5, wherein a surfactant component comprises the following chemicals in a volume percent: polyoxyethylene sorbitan monooleate, CAS # 9005-65-6, 57.1%; sorbitan monooleate, CAS # 1338-43-8, 28.6%; polyoxyethylene sorbitan trioleate, CAS # 9005-70-3, 2.9%; and polyoxyethylene sorbitan monolaurate, CAS # 9005-64-5, 11.4% and (GRAS), limited or no odor and have a flash point greater than 93° C./200° F.

8. The method according to claim 5, wherein an alcohol component comprises alky alcohol ethoxylates with carbon chain lengths of nine to eleven, CAS # 68439-46-3.

9. The method according to claim 5, wherein a fatty alcohol component is methyl soyate, CAS # 68919-53-9.

10. The method according to claim 1, wherein a heavy Naphtha, CAS # 8030-30-6 is blended with the chemical prior to the step of adding the chemical into the bitumen or the heavy crude, to facilitate the blending and dispersing of the chemical by imparting a mechanical energy by introduction of the blend into an intake of a centrifugal pump and recycle of an output from the pump to the intake of the pump until such time as the crude oil with a desired level of the lower composite specific gravity is achieved.

11. The method according to claim 10, wherein 0.84 gallon of the heavy Naphtha, CAS # 8030-30-6 is blended with 10.75 fluid ounces of the chemical, to produce a SuperNaphtha™, prior to mixing with one barrel, 42 US gallons, of the bitumen or the heavy crude.

12. The method according to claim 5, wherein the heavy Naphtha, CAS # 8030-30-6 is blended with the chemical prior to the step of adding a combination of chemicals into the bitumen or the heavy crude, to facilitate the blending and dispersing of the chemical by imparting a mechanical energy by introduction of the blend into an intake of a centrifugal pump and recycle of an output from the pump to the intake of the pump until such time as the crude oil with a desired level of the lower composite specific gravity is achieved.

13. The method according to claim 6, wherein the heavy Naphtha, CAS # 8030-30-6 is blended with the chemical prior to the step of adding a combination of chemicals into the bitumen or the heavy crude, to facilitate the blending and dispersing of the chemical by imparting a mechanical energy by introduction of the blend into an intake of a centrifugal pump and recycle of an output from the pump to the intake of the pump until such time as the crude oil with a desired level of the lower composite specific gravity is achieved.

14. The method according to claim 7, wherein the heavy Naphtha, CAS # 8030-30-6 is blended with the chemical prior to the step of adding a combination of chemicals into the bitumen or the heavy crude, to facilitate the blending and dispersing of the chemical by imparting a mechanical energy by introduction of the blend into an intake of a centrifugal pump and recycle of an output from the pump to the intake of the pump until such time as the crude oil with a desired level of the lower composite specific gravity is achieved.

15. The method according to claim 8, wherein the heavy Naphtha, CAS # 8030-30-6 is blended with the chemical prior to the step of adding a combination of chemicals into the bitumen or the heavy crude, to facilitate the blending and dispersing of the chemical by imparting a mechanical energy by introduction of the blend into an intake of a centrifugal pump and recycle of an output from the pump to the intake of the pump until such time as the crude oil with a desired level of the lower composite specific gravity is achieved.

16. The method according to claim 12, wherein 0.84 gallon of the heavy Naphtha, CAS # 8030-30-6 is blended with 10.75 fluid ounces of the chemical, to produce a SuperNaphtha™, prior to mixing with one barrel, 42 US gallons, of the bitumen or the heavy crude.

17. The method according to claim 1, wherein the chemical is added to the bitumen or the heavy crude, at a well head, after processing to remove water and sand, utilizing an elevated temperature that exists of greater than 74° C./165° F. to facilitate the blending and dispersing of the chemical by imparting of a thermal energy, to achieve the crude oil with a desired level of the lower composite specific gravity.

18. The method according to claim 5, wherein a combination of chemicals is added to the bitumen or the heavy crude, at a well head, after processing to remove water and sand, utilizing an elevated temperature that exists of greater than 74° C./165° F. to facilitate the blending and dispersing of the combination of chemicals, by imparting of a thermal energy, to achieve the crude oil with a desired level of the lower composite specific gravity.

19. The method according to claim 6, wherein a combination of chemicals is added to the bitumen or the heavy crude, at a well head, after processing to remove water and sand, utilizing an elevated temperature that exists of greater than 74° C./165° F. to facilitate the blending and dispersing of the combination of chemicals, by imparting of a thermal energy, to achieve the crude oil with a desired level of the lower composite specific gravity.

20. The method according to claim 7, wherein a combination of chemicals is added to the bitumen or the heavy crude, at a well head, after processing to remove water and sand, utilizing an elevated temperature that exists of greater than 74° C./165° F. to facilitate the blending and dispersing of the combination of chemicals, by imparting of a thermal energy, to achieve the crude oil with a desired level of the lower composite specific gravity.

21. The method according to claim 8, wherein a combination of chemicals is added to the bitumen or the heavy crude, at a well head, after processing to remove water and sand, utilizing an elevated temperature that exists of greater than 74° C./165° F. to facilitate the blending and dispersing of the combination of chemicals, by imparting of a thermal energy, to achieve the crude oil with a desired level of the lower composite specific gravity.

22. The method according to claim 1, wherein a sufficient quantity of the chemical is added to an oil well casing in the following steps:
evacuating the oil well casing's contents to expose perforations in the oil well casing;
immersing the perforations located at a bottom of the oil well casing;
applying pressure to contact the chemical with a resin encapsulated asphaltene resident in the perforations;
removing pressure after a sufficient delay of time to allow saturate and aromatic components, present in a crude oil bearing stratum, to be moved over a bridge, formed by the chemical, and deconstruct asphaltene that, over time, has formed an annulus and reduced a diameter of the perforations; and
observing a flow of the crude oil from the oil well casing at an increased rate compared to a rate prior to the placing of the chemical into the oil well casing.

23. The method according to claim 5, wherein a sufficient quantity of a combination of chemicals is added to an oil well casing in the following steps:
evacuating the oil well casing's contents to expose perforations in the oil well casing;
immersing the perforations located at a bottom of the oil well casing;
applying pressure to contact the chemical with a resin encapsulated asphaltene resident in the perforations;
removing pressure after a sufficient delay of time to allow saturate and aromatic components, present in a crude oil bearing stratum, to be moved over the bridge, formed by a combination of chemicals, and deconstruct asphaltene that, over time, has formed an annulus and reduced a diameter of the perforations; and
observing a flow of the crude oil from the oil well casing at an increased rate compared to a rate prior to the placing of the chemical into the oil well casing.

24. The method according to claim 6, wherein a sufficient quantity of a combination of chemicals is added to an oil well casing in the following steps:
evacuating the oil well casing's contents to expose perforations in the oil well casing;
immersing the perforations located at a bottom of the oil well casing;
applying pressure to contact the chemical with a resin encapsulated asphaltene resident in the perforations;
removing pressure after a sufficient delay of time to allow saturate and aromatic components, present in a crude oil bearing stratum, to be moved over the bridge, formed by a combination of chemicals, and deconstruct asphaltene that, over time, has formed an annulus and reduced a diameter of the perforations; and
observing a flow of the crude oil from the oil well casing at an increased rate compared to a rate prior to the placing of the chemical into the oil well casing.

25. The method according to claim 7, wherein a sufficient quantity of a combination of chemicals is added to an oil well casing in the following steps:
evacuating the oil well casing's contents to expose perforations in the oil well casing;
immersing the perforations located at a bottom of the oil well casing;
applying pressure to contact the chemical with a resin encapsulated asphaltene resident in the perforations;
removing pressure after a sufficient delay of time to allow saturate and aromatic components, present in a crude oil bearing stratum, to be moved over the bridge, formed by a combination of chemicals, and deconstruct asphaltene that, over time, has formed an annulus and reduced a diameter of the perforations; and observing a flow of the crude oil from the oil well casing at an increased rate compared to a rate prior to the placing of the chemical into the oil well casing.

26. The method according to claim 8, wherein a sufficient quantity of a combination of chemicals is added to an oil well casing in the following steps:
- evacuating the oil well casing's contents to expose perforations in the oil well casing;
- immersing the perforations located at a bottom of the oil well casing;
- applying pressure to contact the chemical with a resin encapsulated asphaltene resident in the perforations;
- removing pressure after a sufficient delay of time to allow saturate and aromatic components, present in a crude oil bearing stratum, to be moved over the bridge, formed by a combination of chemicals, and deconstruct asphaltene that, over time, has formed an annulus and reduced a diameter of the perforations; and
- observing a flow of the crude oil from the oil well casing at an increased rate compared to a rate prior to the placing of the chemical into the oil well casing.

\* \* \* \* \*